United States Patent
Yang

(10) Patent No.: US 7,219,057 B2
(45) Date of Patent: May 15, 2007

(54) SPEECH RECOGNITION METHOD

(75) Inventor: Yin-Pin Yang, San Jose, CA (US)

(73) Assignee: Koninklijke Philips Electronics, Eindhoven (NL)

( * ) Notice: Subject to any disclaimer, the term of this patent is extended or adjusted under 35 U.S.C. 154(b) by 0 days.

(21) Appl. No.: 11/147,951

(22) Filed: Jun. 8, 2005

(65) Prior Publication Data

US 2005/0267753 A1 Dec. 1, 2005

Related U.S. Application Data

(63) Continuation of application No. 09/668,541, filed on Sep. 25, 2000, now Pat. No. 6,934,678.

(51) Int. Cl.
*G10L 15/22* (2006.01)

(52) U.S. Cl. ...................... 704/236; 704/257

(58) Field of Classification Search ............ None
See application file for complete search history.

(56) References Cited

U.S. PATENT DOCUMENTS

| | | | | |
|---|---|---|---|---|
| 5,202,926 A | * | 4/1993 | Miki | 704/254 |
| 5,513,298 A | * | 4/1996 | Stanford et al. | 704/275 |
| 5,627,939 A | * | 5/1997 | Huang et al. | 704/256 |
| 5,699,456 A | * | 12/1997 | Brown et al. | 382/226 |
| 6,067,515 A | * | 5/2000 | Cong et al. | 704/243 |
| 6,070,136 A | * | 5/2000 | Cong et al. | 704/222 |
| 6,256,607 B1 | * | 7/2001 | Digalakis et al. | 704/222 |
| 6,347,297 B1 | * | 2/2002 | Asghar et al. | 704/243 |
| 6,934,678 B1 | * | 8/2005 | Yang | 704/221 |

FOREIGN PATENT DOCUMENTS

| | | |
|---|---|---|
| JP | 10190865 A | 7/1998 |
| JP | 11112669 A | 4/1999 |

OTHER PUBLICATIONS

ETSI, "Speech Processing, Transmission and Quality Aspects (STQ); Distributed Speech Recognition; Front-End Feature Extraction Algorithm: Compression Algorithms", ESTI Apr. 2000, pp. 1-20.
Gersho and Gray, Vector Quantization and Signal Compression, 1992, Kluwer Academic Publishers, pp. 309-316.

* cited by examiner

*Primary Examiner*—David D. Knepper

(57) ABSTRACT

A speech recognition method includes receiving signals derived from indices of a codebook corresponding to recognition feature vectors extracted from speech to be recognized. The signals include an indication of the number of bits per codebook index. The method also includes obtaining the string of indices from the received signals, obtaining the corresponding recognition feature vectors from the string of indices, and applying the recognition feature vectors to a word-level recognition process. To conserve network capacity, the size of the codebook and the corresponding number of bits per codebook index, are adapted on a dialogue-by-dialogue basis. The adaptation accomplishes a tradeoff between expected recognition rate and expected bitrate by optimizing a metric which is a function of both.

15 Claims, 4 Drawing Sheets

SPEECH RECOGNITION METHOD

CROSS REFERENCE TO RELATED APPLICATION

This is a continuation of prior application Ser. No. 09/668,541 filed Sep. 25, 2000, now U.S. Pat. No. 6,934,678.

BACKGROUND OF THE INVENTION

1. Field of the Invention

The present invention relates to distributed speech recognition (DSR) systems, devices, methods, and signals where speech recognition feature parameters are extracted from speech and encoded at a near or front end, and electromagnetic signals carrying the feature parameters are transmitted to a far or back end where speech recognition is completed. In its particular aspects, the present invention relates to distributed speech recognition where the front end is provided in a wireless mobile communications terminal and the back end is provided via the communications network.

2. Description of the Related Art

Distributed speech recognition (DSR) is known from the Aurora project of the European Telecommunications Standards Institute (ETSI) for use in mobile communications systems (see http://www.etsi.org/technicalactiv/dsr.com).

It is expected that demand for telephony based speech recognition services, voice web browsing, and other man-to-machine voice communications via portable wireless communication devices will proliferate rapidly, and in the near future much of the available network capacity could be consumed by users talking to (or chatting with) remotely located machines via such communication devices to retrieve information, make transactions, and to entertain themselves.

DSR is under consideration by ETSI for mobile communications systems since the performance of speech recognition systems using speech signals obtained after transmission over mobile channels can be significantly degraded when compared to using a speech signal which has not passed through an intervening mobile channel. The degradations are a result of both the low bit rate speech coding by the vocoder and channel transmission errors. A DSR system overcomes these problems by eliminating the speech coding and the transmission errors normally acceptable for speech for human perception, as opposed to speech to be recognized (STBR) by a machine, and instead sends over an error protected channel a parameterized representation of the speech which is suitable for such automatic recognition. In essence, a speech recognizer is split into two parts: a first or front end part at the terminal or mobile station which extracts recognition feature parameters, and a second or back end part at the network which completes the recognition from the extracted feature parameters.

As in traditional speech recognizers, the first part of the recognizer chops an utterance into time intervals called "frames", and for each frame extracts feature parameters, to produce from an utterance a sequence or array of feature parameters. The second part of the recognizer feeds the sequence of feature parameters into a Hidden Markov Model (HMM) for each possible word of vocabulary, each HMM for each word having been previously trained by a number of sample sequences of feature parameters from different utterances by the same speaker, or by different speakers if speaker-independence is applied. The HMM evaluation gives, for each evaluated word, a likelihood that a current utterance is the evaluated word. Then, finally, the second part of the recognizer chooses the most likely word as its recognition result.

While DSR in accordance with the Aurora Project does not employ vector quantization (VQ), it is generally known to form vector data from feature parameter data and to compress such vector data using a codebook e.g. when sending such data over a channel, wherein each vector is replaced by a corresponding codebook index representing the vector. Thus a temporal sequence of vectors is converted to a sequence or string of indices. At the receiving end the same codebook is used to recover the sequence of vectors from the sequence or string of indices. The codebook has a size Sz necessary to include indices representing each possible vector in a suitably quantized vector space, and each index is described by a number of bits $B = \log_2 (Sz)$ necessary to distinguish between indices in the codebook.

OBJECTS AND SUMMARY OF THE INVENTION

It is an object of the present invention to on average reduce the capacity that will be consumed in communications systems due to distributed speech recognition, without significantly downgrading recognition performance. It is a further object of the present invention that such reduction in required capacity be accomplished by dynamically adjusting the number of bits necessary to represent each recognition feature vector, or a corresponding vector quantization codebook size, in dependence on the specific dialogue or vocabulary size.

The present invention is based on the idea that the expected ultimate recognition rate for both discrete and continuous speech recognition decreases as vocabulary size increases, but increases as the number of bits per codebook index or the associated codebook size increases. Yet vocabulary size may vary significantly from one dialogue to another. Consequently, it is possible to conserve network resources while maintaining a sufficient expected recognition rate by dynamically adjusting the number of bits per codebook index or the associated codebook size in dependence on the number of possible words or utterances which can be spoken and recognized within the framework of a dialogue.

In a preferred approach a tradeoff between bitrate and expected recognition rate is accomplished by optimizing a metric, e.g. minimizing a cost function, which is a function of both bitrate and expected recognition rate. An upper limit on a bitrate of codebook indices is readily determined as the number of bits per codebook index divided by the framing interval for which the codebook index is generated.

Thus, a speech coding method in accordance with the invention for coding speech to be recognized (STBR) at a near end for completion of word-level recognition by a machine at a far end in relation to a dialogue between the near and far ends having an associated vocabulary size (V) comprises extracting recognition feature vectors frame-wise from received speech to be recognized, choosing a number of bits in codebook indices representing recognition feature vectors or an associated codebook size corresponding to the dialogue or associated vocabulary size from among a plurality of choices, selecting indices from entries of the codebook having the associated size corresponding to the extracted recognition feature vectors, and forming signals for transmission to the far end, which signals are derived from a string of the selected indices.

Similarly, a communication device in accordance with the invention comprises a feature vector extractor, a decision block, a coder for selecting indices from a codebook, and a signal former, wherein the decision block chooses a number of bits per index or associated codebook size corresponding to the dialogue or associated vocabulary size from among a number of choices.

Further, in accordance with another aspect of the present invention, the formed signals to be transmitted include an indication of the number of bits per codebook index or associated codebook size.

Thus, a speech recognition method at a far end comprises receiving signals which are derived from a string of the indices selected from entries in a codebook corresponding to recognition feature vectors extracted framewise from speech to be recognized, which signals include an indication of the number of bits per codebook index or associated codebook size, obtaining the string of indices from the received signals, obtaining the corresponding recognition feature vectors from the string of indices using a codebook having the associated size, and applying the recognition feature vectors to a word-level recognition process.

Further, an electromagnetic signal in accordance with the invention is configured such that it has encoded therein first data derived from a string of indices corresponding to entries from a codebook, which entries correspond to recognition feature vectors extracted from speech, and second data indicating a number of bits per codebook index or an associated codebook size.

Other objects, features and advantages of the present invention will become apparent upon perusal of the following detailed description when taken in conjunction with the appended drawing, wherein:

DETAILED DESCRIPTION OF THE PREFERRED EMBODIMENTS

The present invention proposes a man-to-machine communication protocol, which the inventor has termed "Wireless Speech Protocol" (WSP) to compress speech to be transmitted from a near end to a far end over a wireless link and recognized automatically at the far end in a manner useful for automatic speech recognition rather than speech for human perception. WSP employs the concept of distributed speech recognition (DSR), in which the speech recognizer is split into two parts, one at the near end and the other at the far end.

Figure 1:
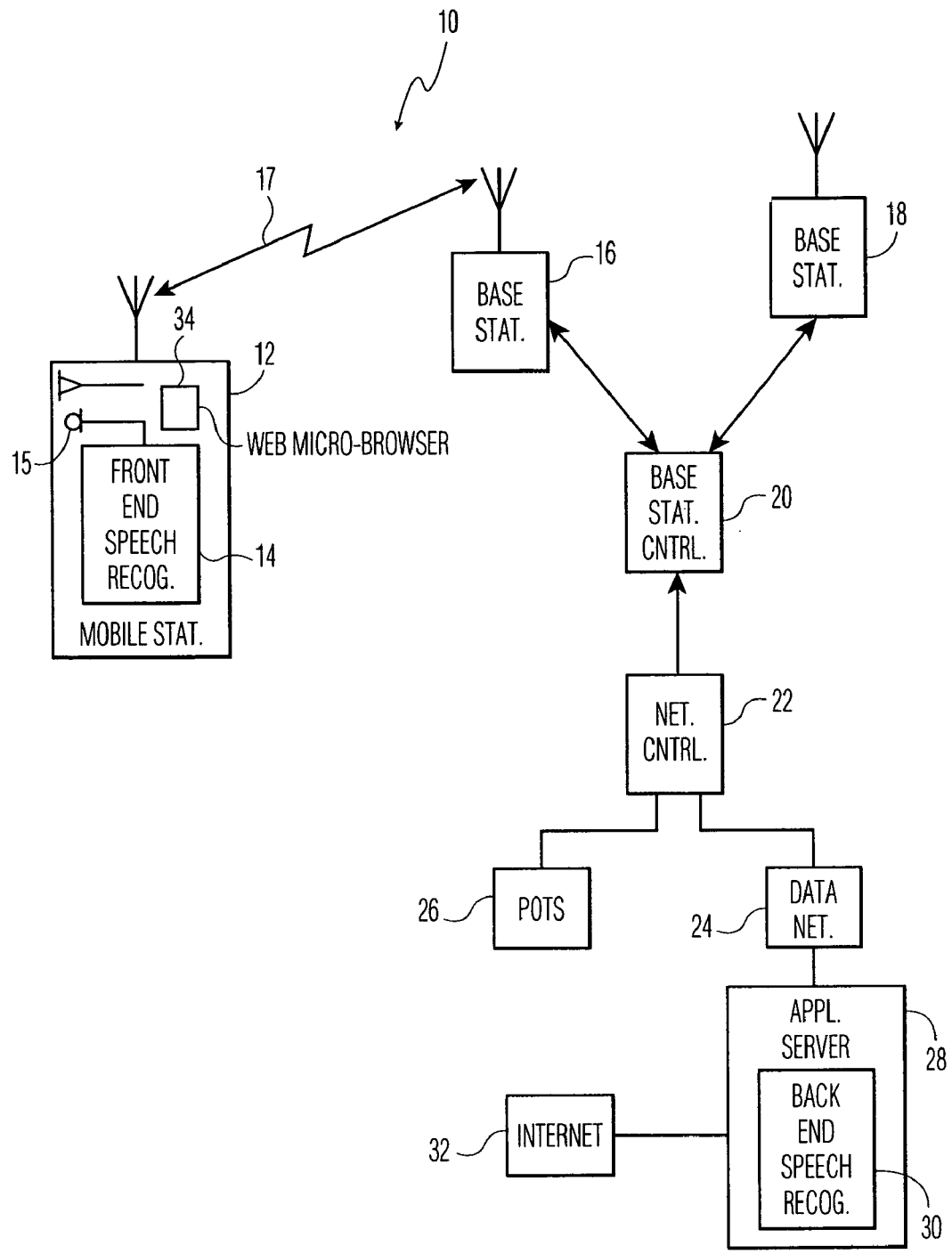
FIG. 1 shows a distributed speech recognition system including a front or near end speech recognition stage at a mobile station and a far or back end speech recognition stage accessed via the network infrastructure.

Referring to FIG. 1, there is shown a digital wireless communication system 10, e.g. Global System for Mobile Communications (GSM), Time Division Multiple Access (TDMA), Code Division Multiple Access (CDMA), or systems proposed for Universal Mobile Telephone System (UMTS) or the Third Generation Partnership Project (3G-PP), including a plurality of mobile stations, of which mobile station 12 is shown including a front or near end speech recognition unit or stage 14. Front end unit 14 is essentially the portion of a traditional word recognizer either for discrete speech, i.e speech spoken in a manner to pause briefly between words, or for natural or continuous speech, which extracts recognition feature vector vectors from speech inputted from the mobile station microphone 15. It may be implemented by running ROM based software on the usual processing resources (not shown) within mobile station 12 comprising a digital signal processor (DSP) and a microprocessor.

Communication system 10 further includes a plurality of base stations having different geographical coverage areas, of which base stations 16 and 18 are shown. For purposes of illustration, mobile station 12 is shown in communication with base station base station 16 via a communications link 17, although as is known, when mobile station 12 moves from the coverage area of base station 16 to the coverage area of base station 18, a handover coordinated or steered via a base station controller 20 which is in communication with base stations 16 and 18 takes place causing the mobile station 12 to establish a communication link (not shown) with base station 18 and discontinue the communication link 17 with base station 16.

Data originating at mobile station 12, including data derived from the output of front end unit 14, is communicated from mobile station 12 to the base station 16, with which the mobile station is currently in communication, and also flows to base station controller 20 and then to a network controller 22 which is coupled to various networks including a data network 24 and other resources, e.g. plain old telephone system (POTS) 26. Data derived from the output of front end unit 14 may be carried over wireless link 17 to base station 16 by being multiplexed into a data channel, or a General Packet Radio System (GPRS) channel, or be sent over a Short Message Service (SMS) or similar channel. Data network 24 is coupled to an application server 28 which includes a back end speech recognition unit or stage 30. Back end unit 30 is essentially the portion of a traditional word recognizer for discrete or natural speech which forms word level recognition on the extracted recognition feature vectors extracted by front end unit 14, typically using a Hidden Markov Model (HMM). Application server 28 may take the form of, or may act in concert with, a gateway, router or proxy server (not shown) coupled to the public Internet 32.

By virtue of a current dialogue, wherein automatic word level recognition by back end unit 30 is done relative to a predetermined set of possible utterances to be recognized, e.g. a word list, the result of speech recognition in back end unit 10 causes data and/or speech obtained from application server 28, or by application server 28 from accessible sources such as the public Internet 32, to be sent to mobile station 12 via data network 24, network controller 22, base station controller 20 and base station 16. That data may be, for example, voice. XML web pages which define the possible utterances in the current dialogue and the associated vocabulary size Sz, which pages are used by a voice controlled microbrowser 34 or other suitable front end client implemented, e.g. by running ROM based software on the aforementioned processing resources at mobile station 12.

The speech recognition algorithm divided between front end unit 14 and back end unit 30 may be based on the known Mel-Cepstrum algorithm, which performs well when there is only a low level of background noise at the front end, or such other algorithm as is appropriate for more demanding background noise environment as may be encountered when using a mobile telephone in an automobile. The search for and evaluation of suitable algorithms for distributed search recognition in the mobile telephony context are work items of the aforementioned Aurora project of ETSI. That project has a current target bitrate of of 4.8 kbits/sec. However, the inventor believes that an average bitrate of about a tenth of the Aurora target bitrate could be achieved using the present invention in which the quantization of the recognition feature vector space, or number of bits needed to encode vector quantization codebook indices is adapted based upon vocabulary size in a current dialogue.

The two main types of speech recognizers, Discrete Hidden Markov Model (HMM) and Continuous Hidden Markov Model (HMM), use different methods to "store" speech characteristics on feature space. In the case of Discrete HMM, the frame-wise compression of speech to be recognized (STBR) is already achieved by Vector-Quantization (VQ), wherein the number of bits B used for a codebook index q value for a frame equals $\log_2(Sz)$, where Sz is the codebook size. Normally, the codebook size Sz in VQ is already optimized for the speech recognition task, and any reduction of the number of bits B per codebook index q will down-grade the recognition rate (RR), theoretically. However, it is possible to "tradeoff" between the recognition RR and the number of bits B by considering how the recognition rate RR decreases as the number of bits B decreases. It is believed that the relationship between recognition rate RR and number of bits B per codebook index or codebook size Sz looks like the graphs shown in FIGS. 3A and 3B for the Discrete HMM and Continuous HMM cases, respectively, which have monotonically decreasing slope in the nature of a Receiver Operator Characteristic (ROC).

Figure 3A:
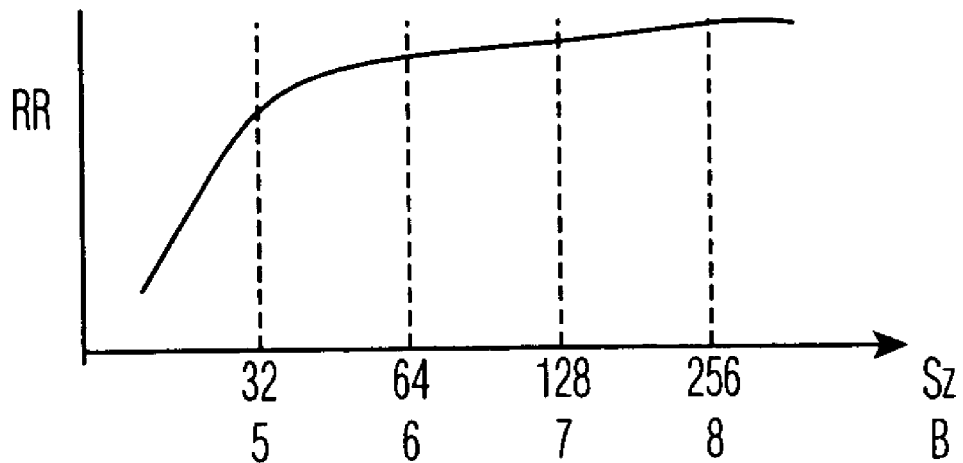
FIGS. 3A and 3B show the form of the relationship between recognition rate (RR) and the size (Sz) of the codebook for speech recognition feature vectors, or number of bits (B) needed for an index therefrom, for discrete and continuous speech recognition, respectively.

It is important to note that in Discrete HMM usually the number of bits B for each q value used for HMM training is the same as used in HMM evaluation (when recognizing). However, FIG. 3A is based on a fixed codebook size Sz (e.g. 256) being used for training all HMM's but a smaller adaptable codebook Sz (e.g. 128, 64, or 32) being used for recognition (HMM evaluation). Therefore, a simple modification of the usual Discrete HMM evaluation algorithm is required to accommodate this difference.

Figure 3B:
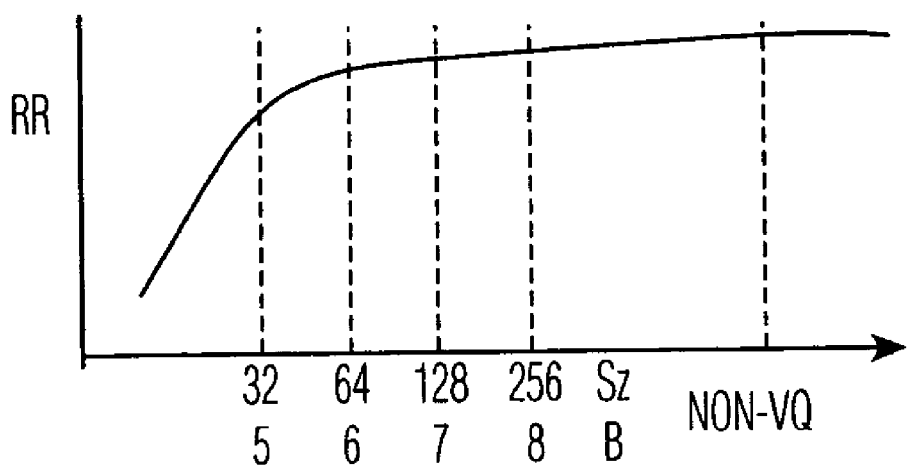

In the case of Continuous HMM, similar concepts are applicable. While VQ is normally not used in Continuous HMM, FIG. 3B is based on Continuous HMM being used in the training phase, but VQ being used in the recognizing phase. (Note: the output of VQ for one frame is a vector. For an utterance, a sequence or array of vectors is produced which can be directly fed into a Continuous HMM evaluation stage).

In the conventional speech recognition task, the number of bits B per codebook index q is required to be large enough to maintain the best recognition rate RR for all kinds of possible recognition tasks. However, when the VQ codebook indices are transmitted over a wireless system, the cost of the transmission should be considered. The wireless transmission resources are limited and expensive, and a lower number of bits per codebook index results in a lower transmitted bitrate BR. Accordingly, in order to tradeoff between bitrate BR and recognition rate RR, a suitable metric is used which a function of both of these parameters.

The following linear cost function is chosen as the metric to be optimized by minimization, although other suitable metrics could be chosen:

$$Cost = BR - w*RR;$$

where, w is a tradeoff weight between the average transmitted bitrate (BR) for the whole utterance and the recognition rate (RR). The average bitrate BR prior to a later-described time-wise compression of a string of codebook indices (q-string) is readily calculated as the number of bits B per codebook index divided by the known fixed interval between the starts of successive frames.

The cost function is optimized on a dialogue-by-dialogue basis, i.e. separately with respect to each "dialogue" instead of with respect to the whole recognition task which could involve a series or tree of different dialogues. Obviously, the grammar rules attached to each dialogue can greatly reduce the complexity of recognition, and relatively we can reduce bitrate BR or number of bits B per codebook index without affecting RR too much, and thus lower the cost. This can be done using the Receiver Operator Characteristics Language Modeling (ROC-LM) technique. This technique is described in the article "Automated Evaluation of Language Models based on Receiver-Operator-Characteristics Analysis", ICSLP 96, by Yin-Pin Yang and John Deller.

In ROC-LM, we have the following formulation:

$$RR = \int_{-\infty}^{\infty} f(x|c) [\int_{-\infty}^{x} f(y|w) dy]^{|V|-1} dx$$

where, $f(x|c)$ is the probability distributed function (p.d.f.) of word-level HMM evaluation results (likelihood) when correct words are fed into their own word templates (HMM), and $f(y|w)$ is the p.d.f. of word-level HMM evaluation results when wrong words are fed into any randomly-picked word template (HMM). |V| is the vocabulary size assuming this is a word recognizer.

When the number of bits B per codebook index is reduced, that is, the codebook size Sz becomes smaller, the ambiguity between $f(x|c)$ and $f(y|w)$ is increased, and consequently, the recognition rate RR is decreased.

According to the above equation, given the vocabulary size |V| (that is, a known dialogue and grammar), the recognition rate RR is plotted on the vertical axis and the number of bits B (orthe corresponding codebook size Sz) on the horizontal axis. Then, we will get FIGS. 3A and 3B for discrete and continuous speech recognition, respectively.

Next is considered the time-wise compression of the string of codebook indices (q-string) generated for an utterance. Due to the continuity property of q values in a q-string, we may use a run-length coding scheme to reduce the bitrate by adding additional bits indicating a run length of a particular q-value. For example, if each q-value is described by 7 bits (for values ranging from 0 to 127) and an additional 3 bits is used to describe run length (ranging from 1 to 8), the illustrative string below of 10 q-values requiring 10*7 bits=70 bits:

1-1-9-9-9-9-5-5-5-127 is reduced to the string of 4 q-values below requiring 4*(7+3)=40 bits:

1 [2]-9[4]-5[3]-127[1]

It should be noted that the relationship between the overall average bitrate (BR) for a q-string (or say an utterance) after the time-wise compression, and B (which is the number of bits per codebook index q) is nonlinear.

Figure 2A:
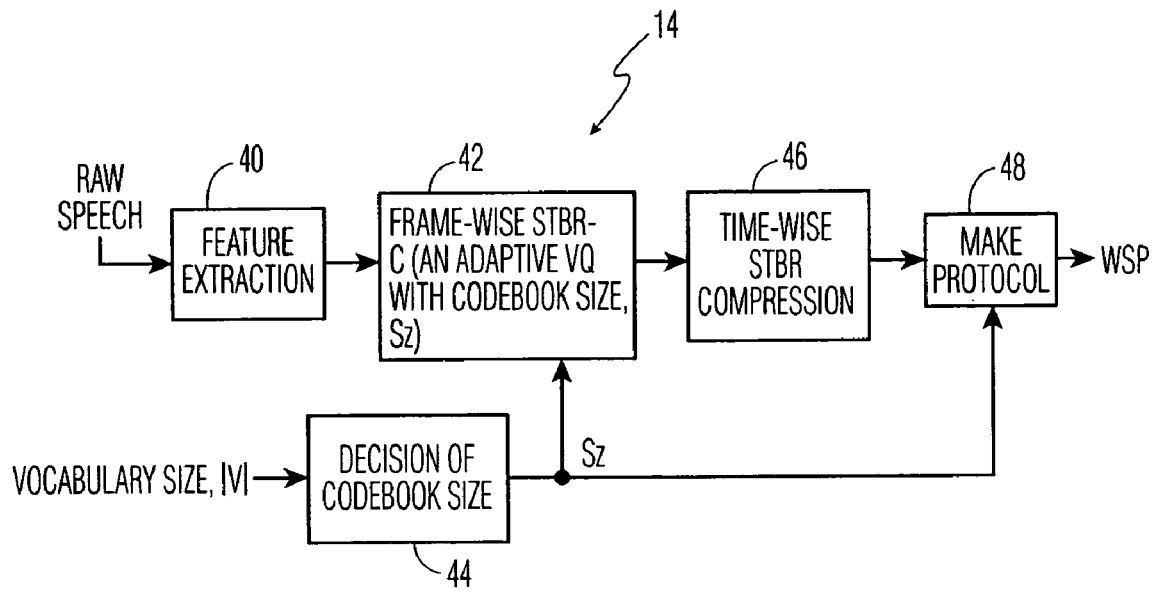
FIGS. 2A and 2B show the front or near end speech recognition stage and far or back end stages of FIG. 1, respectively, in accordance with the invention.

Now, referring to FIG. 2A, front end speech recognition unit is seen to comprise a block 40 which chops speech to be recognized (STBR) into frames and extracts a set of recognition feature parameters for each frame, followed by an adaptive codebook vector quantization block 42 which converts each set of feature parameters for a frame to a feature vector and outputs a codebook index q representing the feature vector. For purposes of compatibility with distributed speech recognition (DSR) of a type proposed by the Aurora Project of ETSI, the output from feature parameter extraction block may be sent without any intervening vector quantization, in accordance with a mode of operation indicated herein as "Layer 1", whereas the mode of operation utilizing adaptive code book vector quantization in accordance with the invention is indicate as "Layer 2".

Figure 4:
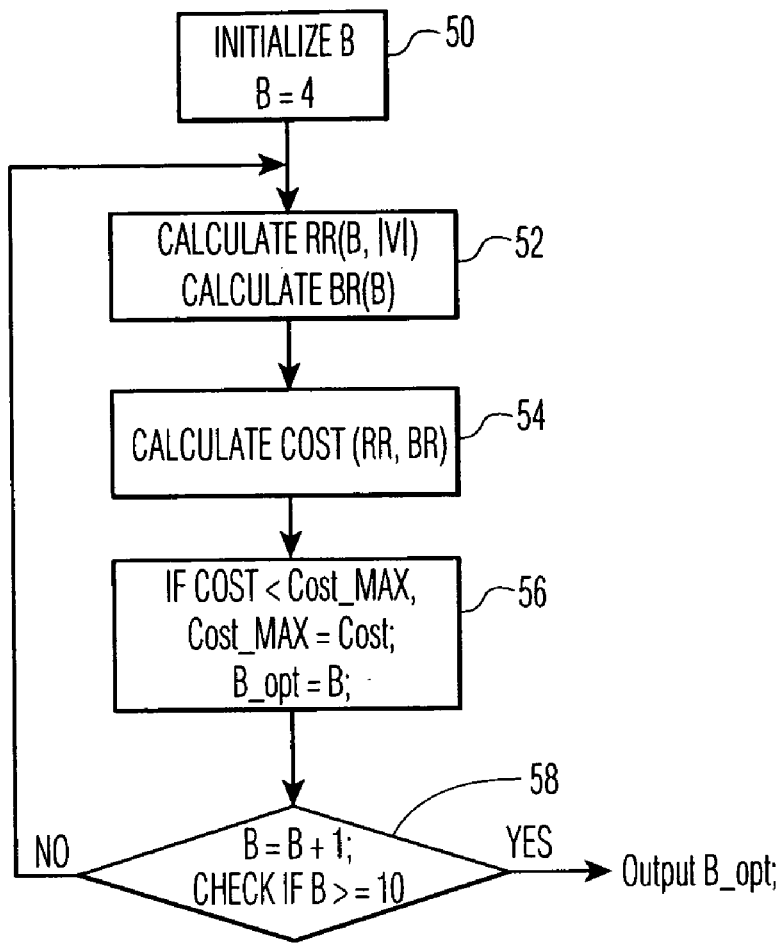
FIG. 4 shows a flowchart for finding the number of bits (B), within a predetermined range, needed for a codebook index which optimizes a cost function in accordance with the invention.

The size Sz of the codebook used by adaptive codebook block 42, or the number of bits B per codebook index q, is decided in decision block 44 in response to the vocabulary size |V| of the current dialogue and communicated to block 42. This decision is based on optimizing a metric which is a function of both expected average bitrate BR and expected recognition rate RR as aforementioned. That decision may be made by calculating the Cost over a range of B values, e.g. B ranging from 4 to 10 (corresponding to codebook size Sz ranging from to $2^4=16$ to $2^{10}=1024$), and finding the lowest B value which yields the minimum Cost. This may be accomplished in accordance with the loop flowcharted in FIG. 4.

Therein, first in block 50 the B value is initialized to the lowest value in the range, namely 4. Then, in block 52 the recognition rate RR is calculated from the B value and from the vocabulary size |V| for the current dialogue in accordance with the applicable one of FIGS. 3A and 3B and the previous discussion. Also in block 52 the expected average bitrate BR is calculated from the B value. If the nonlinear relationship between the expected bitrate BR and the B value is not available, then the linear relationship that bitrate BR is the B value divided by the framing interval may be substituted since it constitutes an upper limit on the actual bitrate. As will appear as the discussion proceeds the actual bitrate is reduced from this upper limit as a result of "time-wise" compression in block 46 of FIG. 2A. Then, in block 54 the Cost is calculated as a function of recognition rate RR and bitrate BR.

In block 56, if the calculated Cost is less than the variable Cost_MAX (which is initialized to a value which is much larger than expected to be calculated using B=4), then the variable Cost_MAX is set equal to the calculated Cost and the variable B_opt is set equal to the current B value. Thereafter, in block 58 the value B is incremented by one unit and it is determined if the resultant B value is greater than or equal to one. If "yes", the current value of B_opt is outputted, whereas if "no", there is a loopback to block 52 to calculate recognition rate RR and bitrate BR using the new B value. As should apparent, the loopbacks continue until the last Cost was calculated using B=10.

Figure 5:
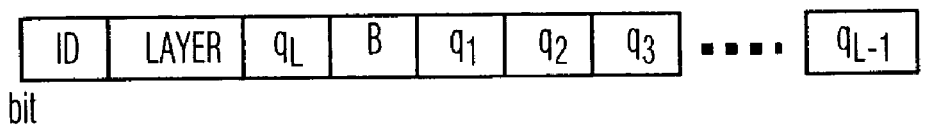
FIG. 5 shows the organization of data over time in a signal transmitted between the near and far ends in accordance with the invention.

The combination of blocks 40 and 42 effectively compresses or quantizes STBR frame-wise into a sequence or string of codebook indices or "q-string". The q-string is fed to a block 46 which performs the aforementioned "time-wise" compression to remove unnecessary or repetitive values from a q-string by e.g. run-length coding. Then, in block 48, the q-string is packed into a protocol in which a data stream is organized over time to indicate at least the number of bits per codebook index B, and the values of the codebook indices q (augmented with run length if time-wise compression block 46 is employed) of the q-string. An exemplary data organization is shown in FIG. 5, where:

ID: identifies this is a WSP protocol (in accordance with the invention);

Layer identifies the layer number, Layer=2 is used for the WSP protocol, whereas Layer=1 is used for purposes of compatibility with the known Aurora project DSR where raw features are sent without VQ;

$q_L$ identifies the length of q-string;

B: identifies the number of bits for each q value; and $q_1, \ldots, q_{L-1}$; are the values of the q-string.

Figure 2B:
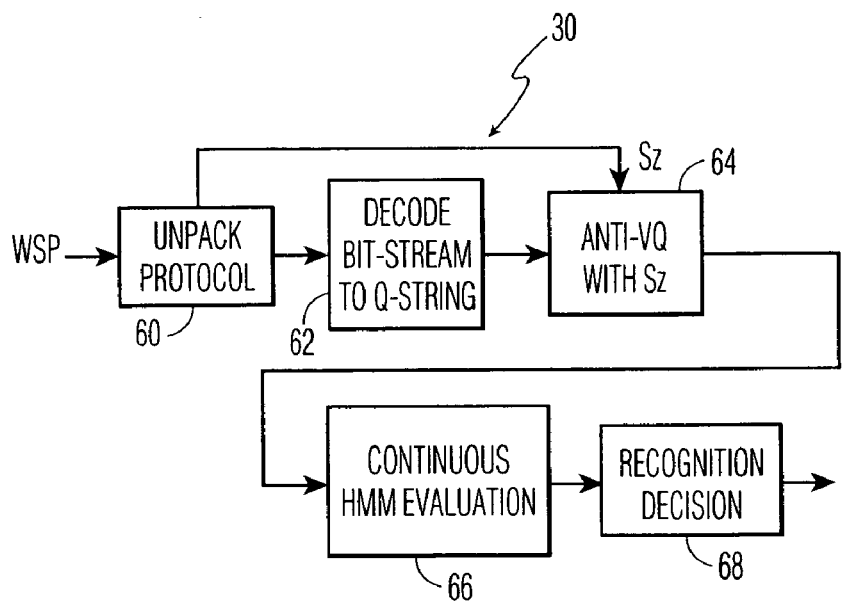

As shown in FIG. 2B, the back end speech recognition stage 30 comprises a block 60 which receives and unpacks the data transmitted in accordance the WSP protocol, a block 62 which decodes the unpacked bit-stream into the q-string, and a block 64 which reverses the vector quantization (VQ) using a codebook of a size $Sz=2^B$, B is the number of bits B per q value indicated in the transmission to obtain a sequence of sets of feature parameters. Lastly, the sequence of sets of feature parameters is inputted to continuous HMM evaluation block 66, and evaluation output is supplied to block 68 wherein the recognition decision is made.

It should now be appreciated that the objects of the present invention have been satisfied. While the present invention has been described in particular detail, it should also be appreciated that numerous modifications are possible within the intended spirit and scope of the invention. In interpreting the appended claims it should be understood that:

a) the word "comprising" does not exclude the presence of other elements or steps than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A method for improving speech recognition rate, comprising:

receiving signals at a back end stage which are sent from a front end stage, which signals are derived from a string of the indices (q-string) selected from entries in a codebook corresponding to recognition feature vectors (f) extracted framewise from speech to be recognized (STBR), and which signals include an indication of the number of bits (B) per codebook index or associated codebook size (Sz), the number of bits being chosen on a dialogue-by-dialogue basis between the front end stage and the back end stage as a function of a tradeoff between a bitrate for the signals and an expected recognition rate;

obtaining the string of indices (q-string) from the received signals;

obtaining the corresponding recognition feature vectors (f) from the string of indices (q-string) using a codebook having the associated size (Sz); and using the recognition feature vectors (f) to recognize at least one utterance in a word-level recognition process (HMM) to provide word-level recognition at an improved recognition rate.

2. The method as claimed in claim 1, further comprising taking an action in dependence on a result of the recognition process.

3. The method as claimed in claim 1, wherein said function of the tradeoff includes a consideration of a cost of transmission for a wireless transmission and the function is a metric of both bitrate BR and recognition rate RR, the metric being a linear cost function which is optimized by minimization and is: cost=BR−w*RR, where w is a tradeoff weight between an average transmitted bitrate BR for a whole utterance and the recognition rate RR.

4. The method as claimed in claim 3, including calculating an average bitrate BR for the metric by dividing the number of bits (B) per codebook index by a fixed interval between starts of successive frames of the framewise vector extraction.

5. The method as claimed in claim 4, wherein the codebook size (Sz) is $2^B$ where B is the number of bits per codebook index.

6. A method for improving speech recognition rate in a communication system, the method comprising the steps of:

receiving signals which are derived from a string of the indices (q-string) selected from entries in a codebook corresponding to recognition feature vectors (f) extracted framewise from speech to be recognized (STBR), and which signals include an indication of the number of bits (B) per codebook index or associated codebook size (Sz), the number of bits (B) being chosen on a dialogue-by-dialogue basis as a function of a tradeoff between a bitrate for the signals and an expected recognition rate;

obtaining the string of indices (q-string) from the received signals;

obtaining the corresponding recognition feature vectors (f) from the string of indices (q-string) using a codebook having the associated size (Sz); and applying the recognition feature vectors (f) to a word-level recognition process (HMM) to provide word-level recognition.

7. The method as claimed in claim 6, further comprising taking an action in dependence on a result of the recognition process.

8. The method as claimed in claim 6, wherein said function of the tradeoff includes a consideration of a cost of transmission for a wireless transmission and the function is a metric of both bitrate BR, and recognition rate RR, the metric being a linear cost function which is optimized by minimization and is: cost=BR −w*RR;

where w is a tradeoff weight between an average transmitted bitrate BR for a whole utterance and the recognition rate RR.

9. The method as claimed in claim 8, including calculating an average bitrate BR for the metric by dividing the number of bits (B) per codebook index by a fixed interval between starts of successive frames of the framewise vector extraction.

10. The method as claimed in claim 9, wherein the codebook size (Sz) is $2^b$ where B is the number of bits per codebook index.

11. A method for improving speech recognition rate in a communication system where signals are sent and received, said signals being derived from a string of the indices (q-string) selected from entries in a codebook corresponding to recognition feature vectors (f) extracted framewise from speech to be recognized (STBR), and said signals including an indication of the number of bits (B) per codebook index or associated codebook size (Sz), the method comprising the steps of:

choosing the number of bits (B) on a dialogue-by-dialogue basis as a function of a tradeoff between a bitrate for the signals and an expected recognition rate;

obtaining the string of indices (q-string) from the received signals;

obtaining the corresponding recognition feature vectors (f) from the string of indices (q-string) using a codebook having the associated size (Sz); and applying the recognition feature vectors (f) to a word-level recognition process (HMM) to provide word-level recognition.

12. The method as claimed in claim 11, further comprising taking an action in dependence on a result of the recognition process.

13. The method as claimed in claim 11, wherein said function of the tradeoff includes a consideration of a cost of transmission for a wireless transmission and the function is a metric of both bitrate BR, and recognition rate RR, the metric being a linear cost function which is optimized by minimization and is: cost=BR−w*RR;

where w is a tradeoff weight between an average transmitted bitrate BR for a whole utterance and the recognition rate RR.

14. The method as claimed in claim 13, including calculating an average bitrate BR for the metric by dividing the number of bits (B) per codebook index by a fixed interval between starts of successive frames of the framewise vector extraction.

15. The method as claimed in claim 14, wherein the codebook size (Sz) is $2^B$ where B is the number of bits per codebook index.

* * * * *